United States Patent [19]
Wilson

[11] Patent Number: 5,278,774
[45] Date of Patent: Jan. 11, 1994

[54] ALARM FOR TRANSIENT UNDERWATER EVENTS

[75] Inventor: William A. Wilson, Anaheim, Calif.

[73] Assignee: Rockwell International Corporation, Seal Beach, Calif.

[21] Appl. No.: 769,279

[22] Filed: Oct. 1, 1991

[51] Int. Cl.$^5$ .................... G06F 15/20; G06F 15/31
[52] U.S. Cl. .................... 364/507; 364/506; 364/508; 364/574; 364/724.01; 381/94
[58] Field of Search ............... 364/506, 507, 508, 572, 364/574, 554, 485, 724; 395/2; 381/94, 47, 43, 71, 67

[56] References Cited

U.S. PATENT DOCUMENTS

| | | | |
|---|---|---|---|
| 4,423,634 | 1/1984 | Audenard et al. | 73/587 |
| 4,604,738 | 8/1986 | Aggarwal et al. | 367/135 |

FOREIGN PATENT DOCUMENTS

| | | | |
|---|---|---|---|
| 0209336 | 4/1987 | European Pat. Off. | G10K 15/02 |
| 0414344 | 5/1990 | European Pat. Off. | G01V 1/38 |

*Primary Examiner*—Thomas G. Black
*Assistant Examiner*—Jacques H. Louis-Jacques
*Attorney, Agent, or Firm*—H. Fredrick Hamann; George A. Montanye; Tom Streeter

[57] ABSTRACT

An alarm for detecting transient senic events determines an estimate of background environmental acoustic events or noise by computing a short time correlation function for individual segments of data and then subtracting an estimated mean of the correlation function. Acoustical events which represent major excursions from the measured background are detected as transient events. The background is continuously updated within selected processing periods chosen to maintain an accurate differentiation for transient events. In further aspects, the residual correlation function is generally detected using a $\chi^2$ statistic which is computed using an estimated covariance of the correlation function and the residual correlation function for a specific window. If a given residual does not represent a detected transient event, that residual is used to estimate the mean and covariance of the background using an exponential integrator.

26 Claims, 4 Drawing Sheets

ALARM FOR TRANSIENT UNDERWATER EVENTS

BACKGROUND OF THE INVENTION

1. Field of the Invention

The present invention relates to sound detection and more particularly to a method and apparatus for detecting transient acoustical events in the presence of background noise. The invention further relates to the detection of transient acoustical events underwater.

2. Related Technical Art

It is often desirable to determine if a series of acoustical elements or an acoustical pattern represents a transient acoustical event. That is, it is desirable to detect the presence of sound producing machines or mechanisms in a particular environment in order to determine if the event is of some significance to a given detection system or observer. Such a determination often needs to be made in the presence of substantial acoustical interference or background noise.

One very desirable application for this technology is in ship board detection systems which detect approaching ships or torpedoes in order to take appropriate defensive measures or countermeasures. It is well understood that it is necessary to obtain sufficiently advanced warning of potential threats such as torpedoes in order to perform adequate evasive or countermeasure action. While some equipment exists for detecting sounds in an observer's general surroundings, it is very difficult to detect short term, faint, sounds in the presence of significant background noise which also includes observer generated noise.

Current detection systems operate by selectively amplifying and filtering acoustical elements within predetermined spectral ranges to provide assistance to a human observer. However, this technique relies on extensive intervention by a human operator, the reliability of which decreases with increases in operator distraction and fatigue, both of which are present under many operating conditions. In addition, this technique does not adequately discriminate between transients and general background noise.

What is needed is an improved method of detecting the presence of true transient events in the midst of background noise with decreased operator involvement. The method would be more useful if high speed digital processing for later threat analysis can be incorporated along with highly automated alarm signaling capabilities.

SUMMARY

In view of the limitations and problems in the art, it is one purpose of the present invention to provide a new apparatus capable of detecting transient acoustical events in the presence of significant levels of noise.

An advantage of the present invention is that it provides transient detection with minimum system complexity, using current sonic detection data sources.

Another advantage of the invention is that it can provide a variety of dynamically adjustable notification levels for transient events.

It is another purpose of the invention to provide transient detection which is highly accurate with a minimum of skilled interaction or interpretation.

These and other purposes, objects, and advantages of the present invention are realized in a method and apparatus for performing transient acoustical detection comprising an input stage for receiving data from acoustical detection elements or devices which represents detected acoustic elements. The received acoustic data is transferred through a windowing element which collects and associates the data into a series of contiguous time segments of predetermined length. Although not necessary, the data segments are generally overlapped to some degree to better match source events, the segments are overlapped by a predetermined amount in the range of twenty-five to fifty percent, depending upon the data transfer rate and degree of data integrity desired. A typical sampling time segment is between about 10 and 100 milliseconds in length.

The background environment acoustic noise is estimated from the segmented data and continuously updated from new data within selected processing periods whose lengths are chosen to maintain an accurate differentiation for anticipated transient events. This estimation is accomplished by using a correlation element to generate a short time correlation function for the data and estimate a mean of the correlation function. Alternatively, where available from a spectrum analysis system, a power spectral density function for the acoustical data can replace the short time correlation function.

The updating step is accomplished by subtracting the resulting mean from the correlation function to form a residue to which a scaling factor, less than one, is applied. The correlation function mean and weighted residue are then summed to form a new updated mean which is retained in a storage or memory element for the next iteration. The correlation function mean may also be weighted by applying the ratio of a predetermined smoothing function and a sample separation factor in which case the residue is weighted by a factor of one minus this ratio.

A detection element, is connected to receive the segmented data and mean, including updates, and to determine when short time acoustical events exceed predetermined criteria for major excursions from the estimated background. In the preferred embodiment, the detection occurs by determining an average covariance of the updated residue, measuring variations in the covariance as new acoustic data is received, and declaring a transient event to be present when such variations exceed a predetermined threshold.

In further embodiments, the detection step comprises computing a $\chi^2$ statistic operation using the values of the covariance and residue over a predetermined data window, and comparing the $\chi^2$ result to preselected threshold values. Generally a log likelihood ratio for the data segment is employed. In addition, an exponential integrator may be applied to the residue when it does not represent a detected transient event, so as to estimate the mean and covariance of the background for continuously updating the background.

BRIEF DESCRIPTION OF THE DRAWINGS

The novel features of the present invention may be better understood from the accompanying description when taken in conjunction with the accompanying drawings in which like numbers refer to like elements and in which.

DETAILED DESCRIPTION OF A PREFERRED EMBODIMENT

The present invention provides a method and apparatus for detecting the occurrence of transient sonic events, especially for underwater acoustic data. The invention determines an estimate of background environmental acoustic events or noise and then detects short time events which represent major excursions from the measured background. The background is continuously updated within selected processing periods whose lengths are chosen to maintain an accurate differentiation for anticipated transient events.

Background noise removal is accomplished by computing a short time correlation function for individual segments of received acoustical data and then subtracting an estimated mean of the correlation function. The residual correlation function is then detected using a $\chi^2$ statistic operation which is computed using an estimated covariance of the correlation function and the residual correlation function for a specific data window. If a given residual resulting from this process does not represent a detected transient event, that residual is used to estimate the mean and covariance of the background using an exponential integrator. In this manner the background is continuously updated during transient detection.

Figure 1:
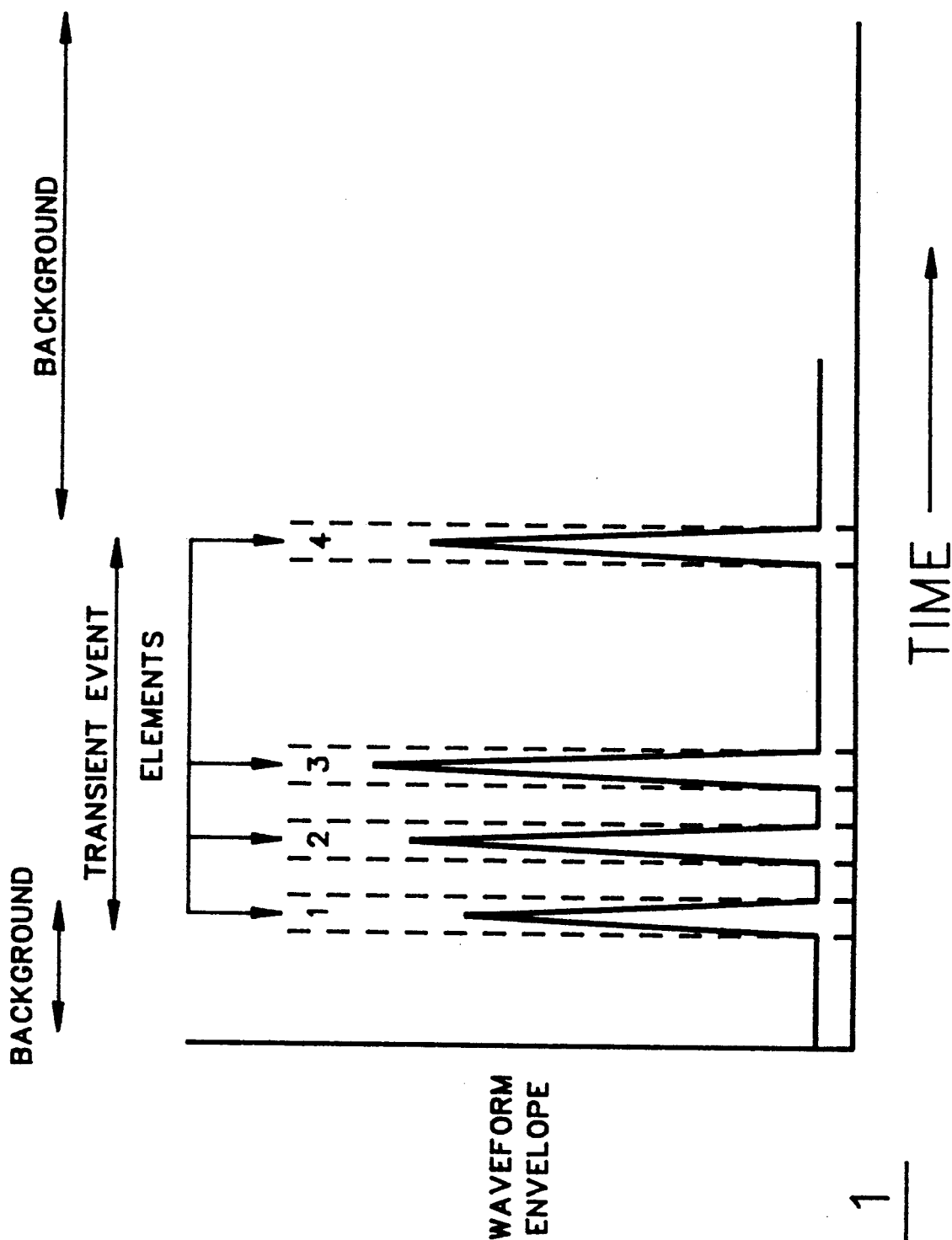
FIG. 1 illustrates typical transient noise patterns encountered.

FIG. 1 illustrates the waveform for a typical acoustical transient or transient event. As illustrated, transients generally consist of several peaks or spikes interspersed with obvious "dead" space. The peaks are referred to as elements of the transient event. An entire transient event may range from 50 milliseconds to 2 seconds in duration with individual elements of the event being about 20 to 80 milliseconds in duration.

One technique for detecting the presence of such transient events is to use a method found useful in speech processing. In this approach the acoustical data is analyzed in segments. The incoming acoustical data is examined a segment at a time and an estimation of the spectrum of each segment is compiled. This estimated spectrum is then matched against a library of previously stored spectra using best match (vector quantization) techniques. A useful library contains transient events that are stored as a sequences of spectra for each element. At the same time, various autoregressive and other techniques can be used to more efficiently approximate the spectra for storage to reduce the connected through known preprocessing stages such as preamplification, amplification, or signal shaping circuits 14 to one or more central acoustical data processors to provide sonic detection. For purposes of illustration only, a single channel of acoustical information is employed in the transient event detection mechanization. Therefore, either a single detection device or a series of multiplexed devices are used for the sensor portion. Of course, an array or series of inventive devices which provide multiple channels of acoustic data would typically be employed in normal applications.

The output from the detectors 12 or processors 14 is presented along one or more data buses 16 to a segmentation/windowing processor 18. The incoming or input acoustical data x(n) is presented as a time sequence or series of data values where n represents the specific position within the time sequence of data $(x_1, x_2, \ldots, x_n)$ in a sample period. That is, the data is presented over time as it is detected and sampled for processing. For purposes of analysis and data storage, the incoming data is divided into discrete time segments or windows $y_n$ ($y_n = x_1, x_2, \ldots$). In exemplary applications, these segments range between about 10 and 100 milliseconds in length. In the preferred embodiments of the invention, the segment length is chosen to be approximately that of individual elements within anticipated transients.

The segments are typically overlapped to some extent with the beginning data points of one segment also included in a previous adjacent segment and the ending data points also included in a subsequent adjacent segment. This overlapping provides maximum coverage during processing to assure data integrity and completeness. The amount of overlap is arbitrary and depends on actual quantity of stored spectrum data. This technique can work reasonably well in many speech processing environments due to a very high signal to noise ratio, the occurrence of massively redundant acoustic data in speech, low distortion signal observation, and large data- or knowledge-bases of known events.

Unfortunately, for many transient events of interest, especially for certain underwater applications, detection must occur in very noisy environments, with acoustical sources that provide minimal and non-redundant data, and the transmission of which is subjected to unknown propagation distortions from multipath and frequency shaping due to acoustical energy absorption or reflections. In addition, there is generally minimal pre-existing information with which to establish an adequate knowledge-base for a library.

The invention avoids these problems by not comparing all of the received acoustic data, or its spectrum, to a library of data. Instead, incoming data is used to determine or construct an approximation of the background noise of the surrounding acoustical environment, and major excursions from the estimated background noise are then classified as transient events, provided they meet certain criteria.

Figure 2:
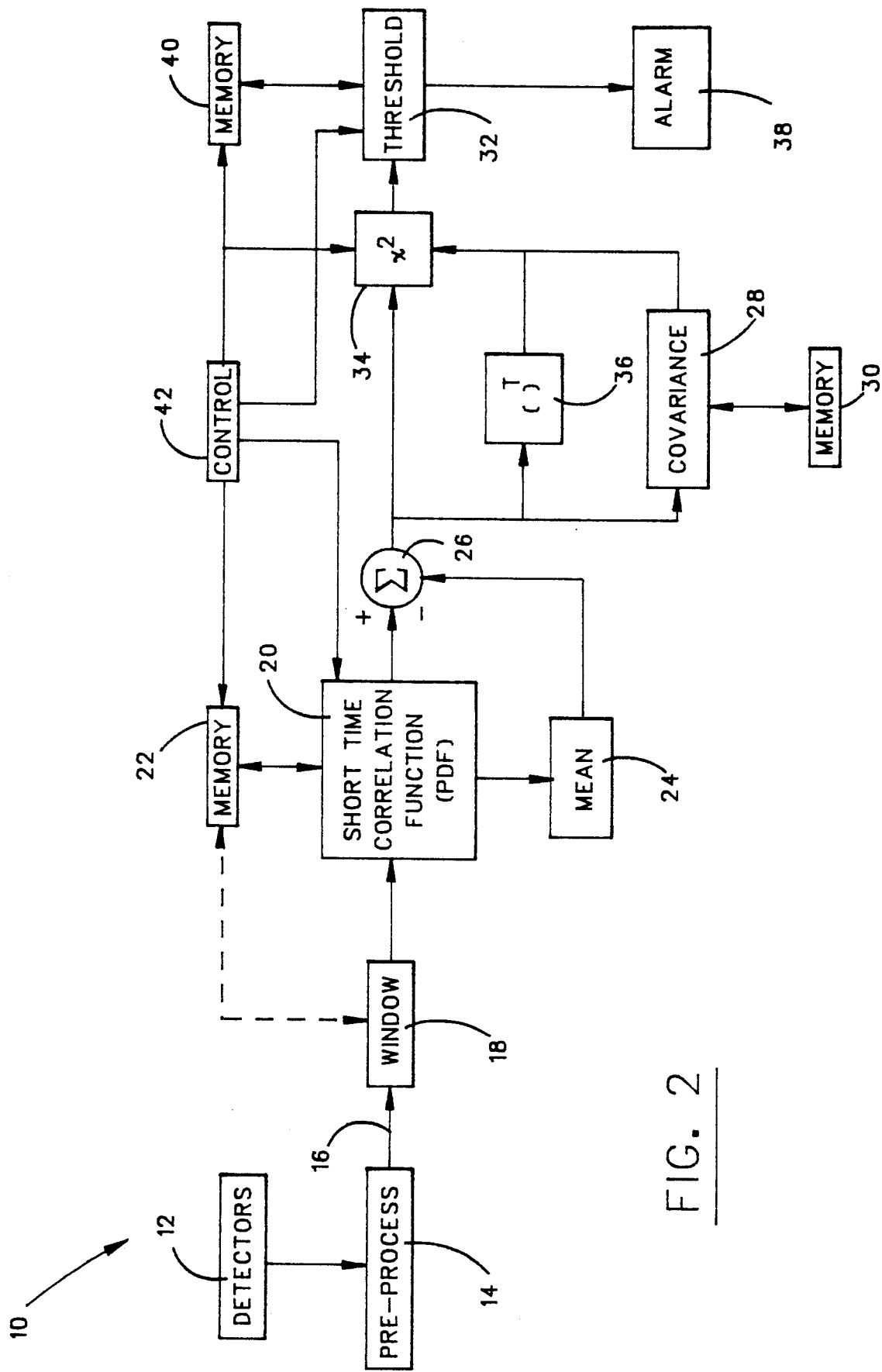
FIG. 2 illustrates an overview schematic of apparatus useful for implementing the present invention.
Figure 3:
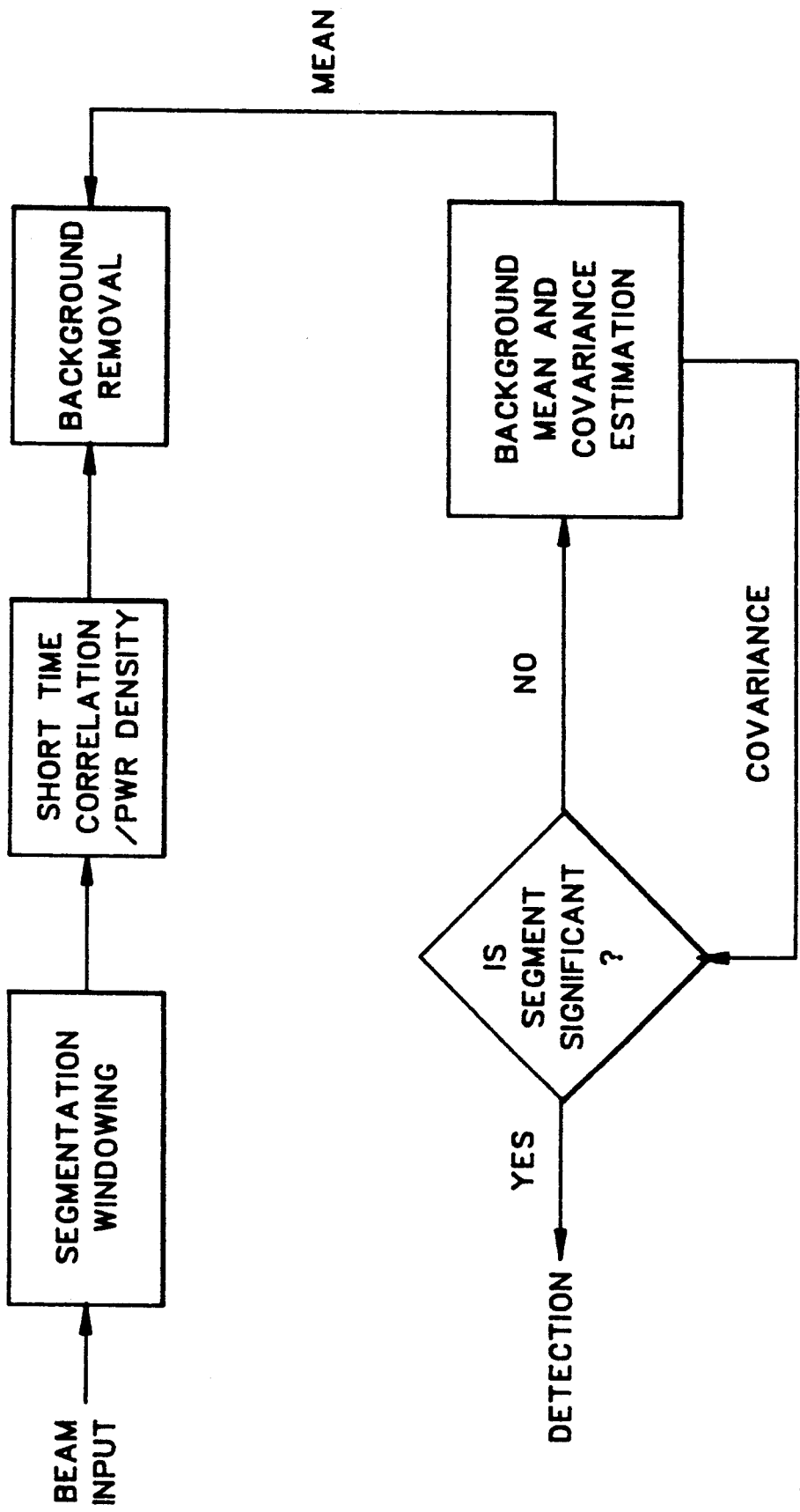
FIG. 3 illustrates a general overview of the operation of a detection system constructed according to the present invention.

To further understand the construction and operation of the present invention, reference is made to the apparatus of FIG. 2 and the operational steps of FIG. 3. In FIG. 2, a series of one or more detectors 12, such as in a passive sonar array, are used to detect the presence of sonic disturbances. The detectors 12 comprise apparatus known in the art such as staves or single sonobuoys, or underwater microphone or telephone receivers which detect sounds propagating through water. Such receivers are the sampling rate and the degree of protection from data loss that is desired. The segment or window overlap is nominally taken to be fifty percent but some experiments with acoustical data have shown no overlap can still provide accurate results. At the same time, weighting of data is not found critical nor in many applications useful and no weighting is preferred when no overlap is used for the adjacent segments.

For the segmentized data, the $r^{th}$ data segment is related to the data samples by the relationship:

$$y_{r,1} = W_i * x_{r \cdot P + 1} \tag{1}$$

where i is the data time sequence within a given segment and extends from 0 to $N-1$, P is the number of points in the segment which are new to that segment from previous segments, N is the total number of points within the segment, and W is a weighting factor employed to tailor the data (such as a Hanning weighting coefficient). If there is a fifty percent segment overlap then P would be equal to N/2, for a twenty-five percent overlap P is 3N/4, and so forth.

The sampling rate is generally determined by the bandwidth characteristics of a given sensor or sensor array. As would be obvious to those skilled in the art, the sensor array generally provides data at a system limiting rate which is slower than the processing capabilities of acoustical analyzers or detection devices. The number of samples in a given segment is somewhat arbitrary and depends largely on specific acoustical applications and the capacity of the processing equipment. Elements already observed or associated with known transients are generally 20 to 50 milliseconds in length. Therefore, the sampling rate during this period determines the number of samples.

As the data is received and collected in a series of segments, a short time correlation function $C_{r,m}$ is formed for each segment in a computational element 20. The data for each segment may have to be stored in a short term memory 22 for this operation where the total data sampling rate exceeds the ability to form the appropriate correlation calculations. This could occur where many sonic detector outputs are multiplexed into a single high speed channel in certain real time applications. The segmented data can also be stored to achieve a temporary processing delay or for some other type of processing synchronization.

While other correlation functions may be found useful within the teachings of the invention, the preferred correlation function, $C_{r,m}$, is expressed by the relationship:

$$C_{r,m} = \sum_{i=0}^{N-m} \sum_{m=0}^{M} y_{r,i} * y_{r,i+m} \qquad (2)$$

Where M is the system order of the function and typically has a value between about eight and sixteen. Analysis of various speech processing systems and other classification processes for transient signals, indicate that system orders in the range of about 6 to 20 are expected. Initial applications of the preferred embodiments indicate a system order range of between 8 and 16 with a selected value of 12 providing good results. Those skilled in the art will readily appreciate the steps required to select the appropriate system order value for a given application.

The short correlation function applied to the data in the computational element 20, provides an estimate of the spectral content or spectrum represented by the data. Any received data or signal consists of some average signal level plus a residual or additional acoustical signal. The average level is due to the contribution of the background noise or general environmental events. The background noise or environmental events incorporated within a received signal can be approximated by the mean of the above short time correlation function.

To estimate an equivalent background noise level for the data, the mean of the short time correlation function is generated for each segment and accrued in a mean value computational element 24. Since the background noise in the environments of interest is typically generated by complex physical processes, the resulting correlation function for these noises can be expected to obey a $\chi^2$ distribution with reasonable accuracy. Therefore, a $\chi^2$ type detector or analysis is employed to segregate the estimated noise.

In the alternative, when spectrum analysis is being performed by another system on the input acoustical data, and its output data is readily available, the short time correlation function can be replaced with a power spectral density function for that data. The mean of this data is used instead, in the process described below.

The mean of the correlation function can be expressed as the function:

$$C_{\mu(r,m)} = A * C_{\mu(r-1,m)} + B\, C_{(r,m)} \qquad (3)$$

where a pair of smoothing constants A and B are applied to reduce noise. The smoothing constants are defined according to the relationships:

$$A = \epsilon(-T_s/T_c)$$

$$B = 1 - A$$

where $T_s$ is the time between adjacent segment samples and $T_c$ is a preselected smoothing time. The smoothing time $T_c$ appears to provide good results when adjusted within the range of about 20 to 120 seconds, although other times may be appropriate as determined by specific applications. Viewed another way, the present mean of the correlation function comprises the sum of the product of the previous mean correlation function $C_{\mu(r-1,m)}$ and a constant, and the product of the current correlation function times another constant. This is appropriate as long as the new correlation function does not represent a significant transient event.

The estimated background can be removed from the correlation function by subtraction in a summation element 26 to provide a residual value or the actual transient data represented by the data function $D_{(r,m)}$. This operation can be expressed simply as:

$$D_{(r,m)} = C_{(r,m)} - C_{\mu(r-1,m)} \qquad (4)$$

The instantaneous covariance $Q_{(r,m,n)}$ of this function is expressed as:

$$Q_{(r,m,n)} = D_{(r,m)} * D_{(r,n)} \qquad (5)$$

and is determined in a covariance computation element 28. The average of this covariance, $Q_{\mu(r,m,n)}$, can then be expressed as:

$$Q_{\mu(r,m,n)} = A * Q_{\mu(r,m,n)} + B * Q_{(r,m,n)} \qquad (6)$$

and can also be stored within the element 28 or compiled within an averaging element 30 using known techniques.

With the covariance and residual information, estimated above noise, each data segment is tested for significance. That is, each segment is tested or compared to preselected criteria in a threshold or limit element 32 to determine if transient elements are present within the data segment. If no transient event occurred within the segment then it is not significant.

In preferred embodiments, the significance check is accomplished by first submitting the data to a $\chi^2$ statistic operation in an element 34. In the statistic element 34, the log likelihood ratio of the segment is determined to within a predetermined accuracy. The $\chi^2$ statistic employed by the element 34 is expressed by the relationship:

$$R = D^T * [Q_\mu]^{-1} * D \quad (7)$$

where matrix notation has been employed on the indices m and n (From Eqs. 4 and 5), and $D^T$ represents the transposition of D in two-dimensional or matrix format. This transposition is accomplished in FIG. 2 in a transposition element 36.

The value of the significance parameter R, from equation 7, is compared to the preselected threshold level or criteria in the limit element 32 to establish if a transient event has occurred. When the value of R exceeds the threshold, a transient event is considered as having occurred within the data segment window, otherwise the segment is considered as containing no information beyond the background noise.

While the above approach correctly determines the mean and covariance of the correlation function according to theory, it is not a highly efficient method of mechanizing these operations. It has been discovered that it is more efficient to process incoming data as a group of segments for each data block rather than a single segment block (of N point blocks) at a time. The length of each processing block can be anywhere from the duration of a single segment to about ten percent of the smoothing time.

In this approach, the mean and covariance are each computed for each block by simply averaging over the block as:

$$C_{B(r,m)} = \frac{\text{SUM(over segments in block)} C_{(r,m)}}{\text{(No. of segments in block)}} \quad (8)$$

$$Q_{(r,m,n)} = \frac{\text{SUM(over segments in block)} Q_{(r,m,n)}}{\text{(No. of segments in block)}} \quad (9)$$

In this configuration the correlation function element 20, FIG. 2, receives a series of segments on which it acts to provide the appropriate correlation function data, and has a counting feature which counts the number of segments received. At the same time, the mean computation element 24 also receives the data for several segments, and counts the number of segments received, prior to generating an output.

The long term average mean and covariance are again computed using the exponential integration constants A' and B' where:

$$A' = e^{(-T_B/T_C)}$$

$$B' = 1 - A'$$

and where B' represents the separation time between data blocks. The long term smoothing for these functions may then be expressed as:

$$C_{M(r,m)} = A' * C_{M(r-1,m)} + B' * C_{B(r,m)} \quad (10)$$

and $$Q_{M(r,m,n)} = A' * Q_{M(r,m,n)} + B' * Q_{B(r,m,n)} \quad (11)$$

The threshold may be determined theoretically from the $\chi^2$ distribution. However, the distribution of the correlation function is not exactly $\chi^2$ and is best set by experimentation and application knowledge. Those skilled in the art will readily recognize the procedures used to test any detection system against actual field data and, therefore, the procedure used to adjust the thresholds.

An advantage of the invention is that the thresholds may be dynamically adjusted depending upon applications and changes in application scenarios. In this manner, the invention can be adjusted to be more or less selective in source recognition depending upon changes in the operating environment for the sensors. In addition, the present invention allows the use of multiple criteria. The threshold levels can be applied as a series of values each of which corresponds to a higher likelihood value for transients, or to an increased threat level.

When there is a detection of a transient event, above threshold, a detection signal is provided on an output bus to an alarm device or devices 38. At the same time, the detection signal can be stored in a memory device (not shown) along with various other related pieces of information such as time, sensor and source data, etcetera, for later "mission-type" analysis.

The acoustical transient detection apparatus 10 can also include a controller 42 which is used to synchronize the operations of various computations, memory read/write cycles and data transfer as would be apparent to those skilled in the art.

Figure 4:
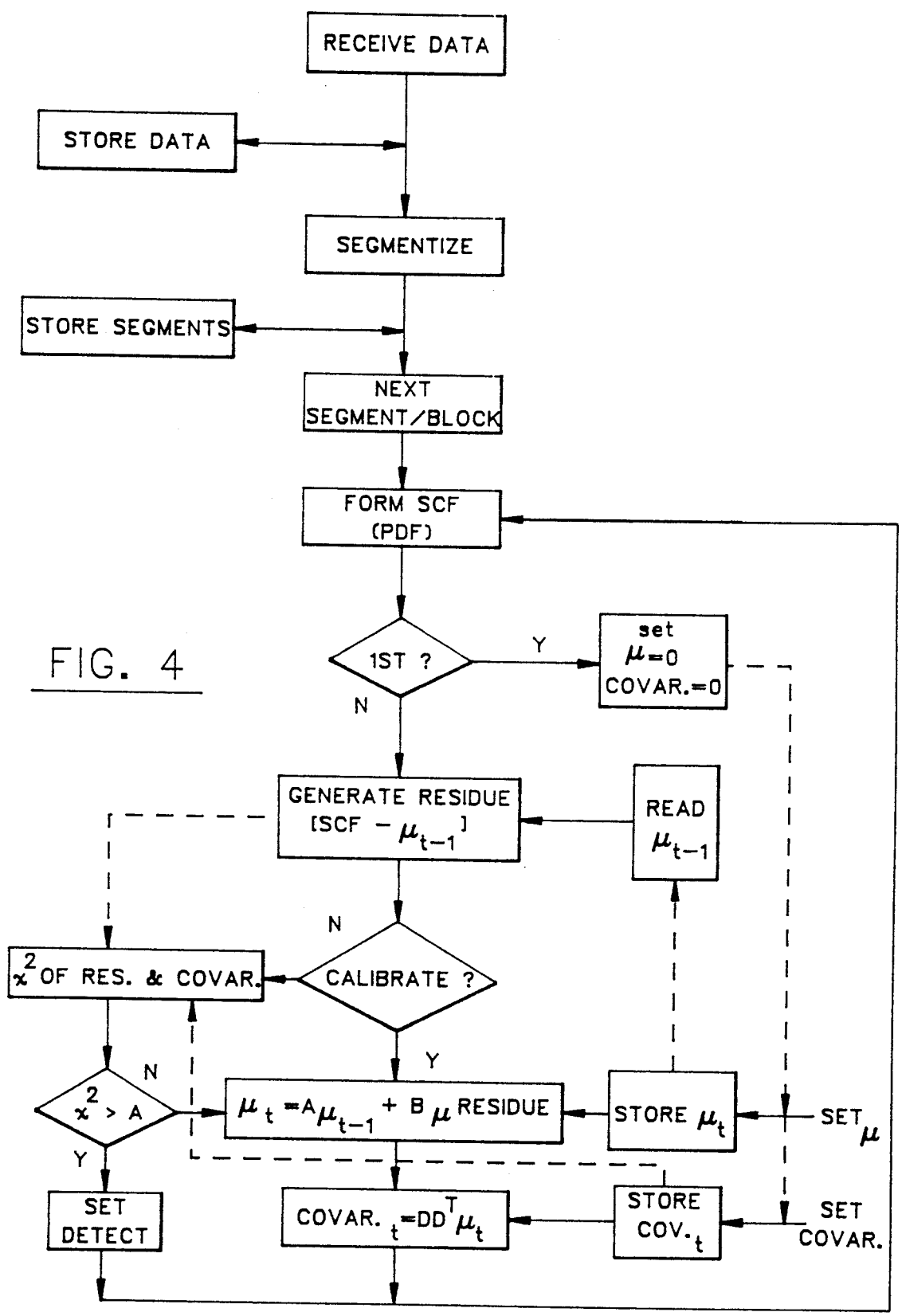
FIG. 4 illustrates a detailed overview of the operation of the present invention.

A more detailed overview of the steps used to achieve the above acoustical detection is illustrated in FIG. 4. As seen in FIG. 4, the detection system 10 receives data which is then segmented for analysis. The raw or segmented data can also be stored as desired. Each segment is transferred to the appropriate apparatus for computing the short time correlation function. In the preferred embodiments since the segments are taken in blocks, this step is illustrated in the alternative as "Next Segment/Block".

If the segment being selected is the first segment, then the mean and covariance values, cannot vary from self, are set equal to zero for use by subsequent processing steps. If this is not the first segment or segment block, the mean of the previous segment is subtracted from the correlation function to provide the residual data value. The mean of the short time correlation (or alternatively a power density) function for the second segment or block is used to establish the background to be used for subsequent operations. That is, the residual is set equal to the correlation function output (SCF- 0) for the second segment as the background noise value. The detection system then receives and processes each subsequent data segment, or block of segments, using the desired short time correlation operation. An estimate of the mean of the short time correlation function (Eq. 2) is generated for subsequent data segments and periodically updated for removing the estimated noise or background during signal processing. As previously discussed, the correlation function can be replaced with a power density function where spectrum analysis data is already available from other apparatus.

When the detection system is first started or initialized a period of time is allowed for the system to process acoustical data and develop a sufficiently large database of background information before any signal detection begins. This initialization can occur at any time, and could employ some form of environmental control or isolation to assure that only background noise is being registered by the input sensors.

During the initial calibration of the detection system the mean of the residual, data, and the covariance of the mean are computed and stored for use in later analysis. Since the mean and covariance employ contributions from previous values, it is important to have a reasonable period of time before commencing the transient detection process. The time period chosen depends upon the specific application and the amount of noise generally encountered. Those skilled in the art will readily recognize the steps required to determine the amount of time required to establish an adequate background value prior to detection.

Once the initialization or system calibration period is over and an adequate background noise level is established, the system searches for detectable transient events. This is accomplished by using the residue information in the $\chi^2$ test and computing the covariance. The results are then compared to the alarm or threshold value "A". If the $\chi^2$ result does not exceed, or match, the threshold alarm value then the segment is considered as having no significance and a new mean and covariance are computed and the next segment or block selected. If the threshold is exceeded, then a detection signal is sent and an appropriate alarm or alarms activated before the next segment or block is selected.

The initial values of the mean and covariance can also be preselected or set from external sources where desired, as where there is a preferred database for the application of interest or there are multiple detection systems which require a common database of acoustical information, especially about each other.

What has been described is a new technique for detecting the presence of transient acoustical events in a relatively noisy environment such as underwater. The technique allows improved detection with minimal complexity and real time alarm operations. The technique also provides flexibility in detection warning criteria.

The foregoing description of preferred embodiments has been presented for purposes of illustration and description. It is not intended to be exhaustive nor to limit the invention to the precise forms disclosed, and many modifications and variations are possible in light of the above teaching. The embodiments were chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What I claim as my invention is:

1. A method for issuing an alarm in response to a transient underwater event, the method comprising the steps of:
    (a) using a hydrophone to convert underwater sound for a predetermined time into a window of signal;
    (b) repeating step (a) until a predetermined number of windows have been converted from the underwater sound;
    (c) making an estimate of background noise in the windows;
    (d) using a hydrophone to convert underwater sound for a predetermined time into a new window of signal;
    (e) determining whether the new window of signal includes a short time event which exceeds predetermined criteria for major excursions from the estimated background noise;
    (f)
        (A) if the new window of signal does not include such an event, then including the new window in the windows whose background noise estimates are to be considered in step (c); and
        (B) if the new window of signal does include such an event, then issuing an alarm; and
    (g) repeating steps (c) through (g).

2. The method of claim 1 wherein said step of making an estimate of background noise comprises the steps of generating a short time correlation function for said data and estimating a mean of said correlation function.

3. The method of claim 2 wherein the steps of making an estimate of background noise further comprises the steps of:
    (a) subtracting said mean from said correlation function to form a residue;
    (b) weighting said residue with a scaling factor less than one; and
    (c) summing said mean and weighted residue to form a new updated mean.

4. The method of claim 3 further comprising the steps of:
    (a) weighting said new updated mean with the ratio of a predetermined smoothing function and a sample separation factor; and
    (b) weighting said residue with a factor of one minus said ratio.

5. The method of claim 3 wherein said step of detecting comprises the steps of:
    (a) computing a $\chi^2$ statistic operation using a covariance and the residual over a predetermined data window;
    (b) comparing said $\chi^2$ result to preselected threshold values; and
    (c) declaring a transient event present when said $\chi^2$ result exceeds said threshold.

6. The method of claim 1 wherein said step of making an estimate of background noise comprises the steps of receiving spectral data and generating a power density spectrum function for said data and estimating a mean of said density function.

7. A method for issuing an alarm in response to a transient underwater event, the method comprising the steps of:
    (a) using a hydrophone to convert underwater sound for a predetermined time into a window of signal;
    (b) repeating step (a) until a predetermined number of windows have been converted from the underwater sound;
    (c) generating a short time correlation function for the signal in the windows;
    (d) generating a mean of the correlation function;
    (e) subtracting the mean from the correlation function to produce a residual;
    (f) determining an average covariance of the residual;
    (g) using a hydrophone to convert underwater sound for a predetermined time into a new window of signal;
    (h) repeating steps (c) through (g) on windows including the new window;
    (i) determining the difference between the covariance determined by step (f) with the covariance determined by step (h);
    (j) issuing an alarm when the difference exceeds a threshold; and
    (k) repeating steps (c) through (k).

8. The method of claim 7 wherein said step of measuring comprises the step of computing a $\chi^2$ statistical operation using said covariance and the residual over a predetermined data window.

9. The method of claim 7 further comprising the step of determining a log likelihood ratio for the new window.

10. The method of claim 7 further comprising the step of applying an exponential integrator to the residual when it does not represent a detected transient event.

11. The method of claim 1 further comprising the step of segmentizing each window of signal into a series of data points over a predetermined time period.

12. The method of claim 11 further comprising the step of providing the windows of signal in an overlapping timed relationship prior to said short time correlation function generation step.

13. A method for issuing an alarm in response to a transient underwater event, the method comprising the steps of:
   (a) using a hydrophone to convert underwater sound for a predetermined time into a window of signal;
   (b) repeating step (a) until a predetermined number of windows have been converted from the underwater sound;
   (c) generating a power density function for the signal in the windows;
   (d) generating a mean of the density function;
   (e) subtracting the mean from the density function to produce a residual;
   (f) determining an average covariance of the residual;
   (g) using a hydrophone to convert underwater sound for a predetermined time into a new window of signal;
   (h) repeating steps (c) through (g) on windows including the new window;
   (i) determining the difference between the covariance determined by step (f) with the covariance determined by step (h);
   (j) issuing an alarm when the difference exceeds a threshold; and
   (k) repeating steps (c) through (k).

14. An apparatus for issuing an alarm in response to a transient underwater event, the apparatus comprising:
   (a) a hydrophone for converting underwater sound for a predetermined time into a window of signal;
   (b) means for repeatedly actuating the hydrophone until a predetermined number of windows have been converted from the underwater sound;
   (c) means for making an estimate of background noise in the windows;
   (d) means for actuating the hydrophone to convert underwater sound for a predetermined time into a new window of signal;
   (e) means for determining whether the new window of signal includes a short time event which exceeds predetermined criteria for major excursions from the estimated background noise;
   (f)
      (A) if the new window of signal does not include such an event, then means for including the new window in the windows whose background noise estimates are to be considered in step (c); and
      (B) if the new window of signal does include such an event, then means for issuing an alarm; and
   (g) means for repeatedly actuating the means described in elements (c) through (g).

15. The apparatus of claim 14 wherein the means for making an estimate of background noise comprises:
   (a) means for generating a short time correlation function for said data; and
   (b) means for estimating a mean of said correlation function.

16. The apparatus of claim 15 wherein the means for making an estimate of background noise further comprises:
   (a) means for subtracting said mean from said correlation function to form a residue;
   (b) means for weighting said residue with a scaling factor less than one; and
   (c) means for summing said mean and weighted residue to form a new updated mean.

17. An apparatus of claim 16 further comprising:
   (a) means for weighting said new updated mean with the ratio of a predetermined smoothing function and a sample separation factor; and
   (b) means for weighting said residue with a factor of one minus said ratio.

18. The apparatus of claim 16 wherein the means for detecting comprises:
   (a) means for computing a $\chi^2$ statistic operation using a covariance and the residual over a predetermined data window;
   (b) means for comparing said $\chi^2$ result to preselected threshold values; and
   (c) means for declaring a transient event present when said $\chi^2$ result exceeds said threshold.

19. The apparatus of claim 14 wherein the means for making an estimate of background noise comprises means for receiving spectral data, means for generating a power density spectrum function for said data, and means for estimating a mean of said density function.

20. An apparatus for issuing an alarm in response to a transient underwater event, the apparatus comprising:
   (a) a hydrophone for converting underwater sound for a predetermined time into a window of signal;
   (b) means for repeatedly actuating the hydrophone until a predetermined number of windows have been converted from the underwater sound;
   (c) means for generating a short time correlation function for the signal in the windows;
   (d) means for generating a mean of the correlation function;
   (e) means for subtracting the mean from the correlation function to produce a residual;
   (f) means for determining an average covariance of the residual;
   (g) means for actuating the hydrophone to convert underwater sound for a predetermined time into a new window of signal;
   (h) means for repeatedly actuating the means described in elements (c) through (g) on windows including the new window;
   (i) means for determining the difference between the covariance determined by element (f) with the covariance determined by element (h);
   (j) means for issuing an alarm when the difference exceeds a threshold; and
   (k) means for repeatedly actuating the means described in elements (c) through (k).

21. The apparatus of claim 20 wherein the means for measuring comprises means for computing a $\chi^2$ statistical operation using said covariance and the residual over a predetermined data window.

22. The apparatus of claim 20 further comprising means for determining a log likelihood ratio for the new window.

23. The apparatus of claim 20 further comprising means for applying an exponential integrator to the residual when it does not represent a detected transient event.

24. The apparatus of claim 14 further comprising means for segmentizing each window of signal into a series of data points over a predetermined time period.

25. The apparatus of claim 24 further comprising means for providing the windows of signal in an overlapping timed relationship prior to actuating said short time correlation function generation means.

26. An apparatus for issuing an alarm in response to a transient underwater event, the apparatus comprising:
 (a) a hydrophone for converting underwater sound for a predetermined time into a window of signal;
 (b) means for repeatedly actuating the hydrophone until a predetermined number of windows have been converted from the underwater sound;
 (c) means for generating a power density function for the signal in the windows;
 (d) means for generating a mean of the density function;
 (e) means for subtracting the mean from the density function to produce a residual;
 (f) means for determining an average covariance of the residual;
 (g) means for actuating the hydrophone to convert underwater sound for a predetermined time into a new window of signal;
 (h) means for repeatedly actuating the means described in elements (c) through (g) on windows including the new window;
 (i) means for determining the difference between the covariance determined by step (f) with the covariance determined by step (h);
 (j) means for issuing an alarm when the difference exceeds a threshold; and
 (k) means for repeatedly actuating the means described in elements (c) through (k).

* * * * *